3,465,340
HYPERBOLIC RADIO NAVIGATION SYSTEMS OF THE PHASE COMPARISON TYPE
William Joseph O'Brien and Dennis Alfred Hendley, London, England, assignors to Decca Limited, London, England, a British company
Filed Aug. 15, 1968, Ser. No. 752,936
Claims priority, application Great Britain, Aug. 18, 1967, 38,141/67
Int. Cl. G01s 1/30
U.S. Cl. 343—105                                      14 Claims

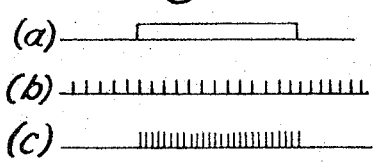
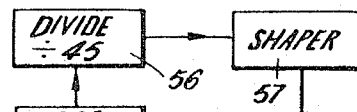
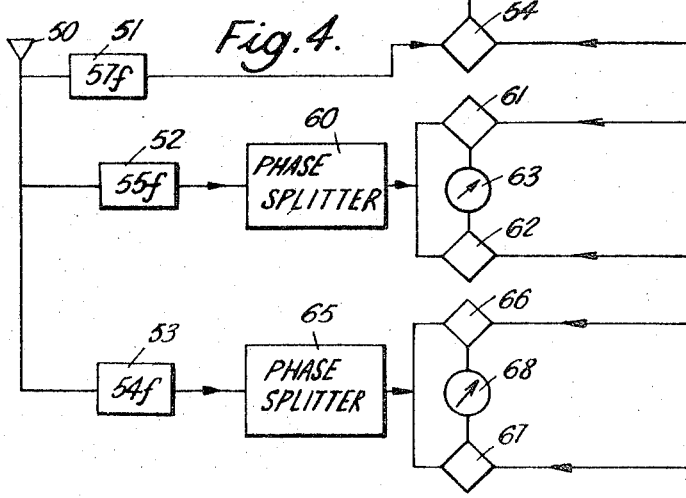
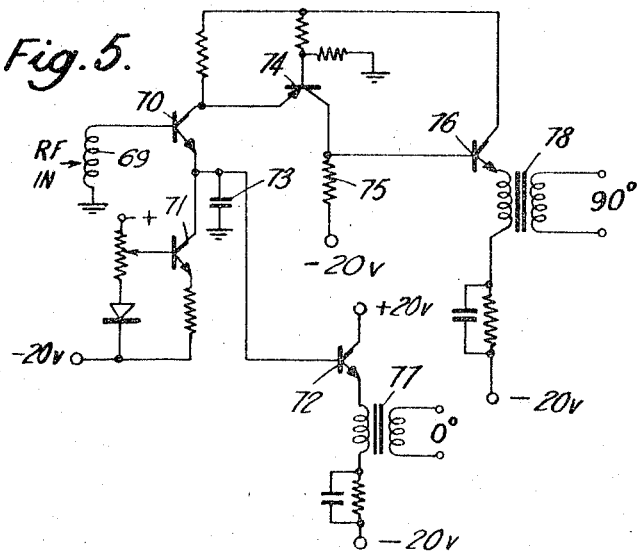

ABSTRACT OF THE DISCLOSURE

A receiver for use with a hyperbolic radio navigation system in which synchronised signals of frequency $pf$ and $nf$ are radiated simultaneously from spaced transmitting stations, each frequency being radiated by only one station at a time, $p$ and $n$ being different integers, and $f$ being a fundamental frequency, has an oscillator at a frequency $mf$ when $m$ is an integer which may be the same or different from $p$ and $n$. Said oscillator is synchronised with a received signal of frequency $pf$ and a frequency divider providing a time index at frequency $1f$ is locked to the output of the oscillator. Timing means responsive to the time interval between the $1f$ time index and a next succeeding time index locked to the $nf$ signals provide an indication of the phase relation between the received signals. The time interval determined by said timing means can be integrated to provide a positional indication. This system avoids the ambiguities inherent in the use of frequency dividers in phase comparison systems and also avoids the unreliability which occurs if frequency multiplication by factors greater than about 12 is used. It thus permits the use of large factors for $n$, $m$ and $p$, for example 1000 or more.

BACKGROUND OF THE INVENTION

Field of the invention

This invention relates to hyperbolic radio navigation systems in which synchronised signals of two or more different frequencies, harmonically related to one another, are simultaneously radiated from spaced transmitters whereby positional information may be obtained at a mobile receiver by phase comparison of the received signals. By harmonically related frequencies are meant frequencies which are all harmonics of a common fundamental.

Prior art

In such systems, as for example the well-known Decca Navigator System (Decca is a registered trademark), the signals from a pair of stations are brought to a common comparison frequency at the receiver; usually this is done by frequency multiplication to bring the signals to the lowest common multiple frequency but it may be done by frequency divisions. Frequency division introduces ambiguities since, for example, if a signal of frequency $rf$ is divided down by a factor $r$, a cycle of the output of frequency $f$ might be locked to any one of $r$ different cycles of the input frequency. When frequency division is employed in a phase comparison receiver, this ambiguity has to be resolved by the use of additional transmitted information. This may be provided for example by transmitting three or more harmonically related signals e.g., 3, 4 or 5 signals, simultaneously from each transmitting location in turn.

When the required multiplication factor exceeds about 12, the reliability of a system using frequency multiplication becomes unacceptable. This is primarily because noise and/or interference on a signal introduces phase flutter. On frequency multiplication, this phase flutter is multiplied and, in practice, a multiplication factor above 12 results in loss of the wanted carrier signal. Consider in another way, if jumps in phase occur and if such jumps are a large fraction of cycle, it becomes no longer possible to follow gradual changes of phase angle as the correct cycle is lost.

If a frequency division system is employed, when the division factor is greater than about 12, the resolution of the ambiguities becomes difficult and unreliable. The present invention, however, is directed to making use of the frequency division technique in an integrating navigation system in which the problem of resolution of ambiguities in a divider is avoided.

SUMMARY OF THE INVENTION

According to the present invention, there is provided a receiver for use with a hyperbolic radio navigation system in which synchronised signals of frequency $pf$ and $nf$ are radiated simultaneously from spaced transmitting stations, each frequency being radiated by only one station at a time, $p$ and $n$ being different integers greater than 12 and $f$ being a fundamental frequency, which receiver comprises an oscillator at a frequency $mf$ where $m$ is an integer greater than 12 which may be the same or different from $p$ and $n$, means for synchronising said oscillator which a received signal of frequency $pf$, a frequency divided providing a time index at frequency $1f$ locked to the output of the oscillator, and timing means responsive to the time interval between the $1f$ time index and a next succeeding time index locked to the $nf$ signals.

With this arrangement, the time index at frequency $1f$ is locked to one of the received signals but, because the $1f$ frequency is produced by frequency division, ambiguities may be present in the locking of the divider. Once set in operation, the divider locking does not change and hence the two time indices have a time difference which will vary in accordance with changes in the difference of transmission propagation times from the stations transmitting the $pf$ and $nf$ signals to the receiver. This time difference may therefore be integrated and, provided the initial setting is correct, it will give a continuous indication representative of a hyperbolic position line through the position of the vehicle. A second position line may be determined in a similar way to give a position fix.

The indication of integrated time difference may be obtained in a number of different ways. In one arrangement, the time indices are short duration impulses used to start and stop a counter counting clock pulses, i.e., constant frequency pulses and the counter output is interrogated and transferred to a computer at a frequency high enough such that, at the maximum possible speed of the vehicle, there will be less than ¼ of a cycle of the effective hyperbolic pattern frequency between interrogations; this condition is necessary in order to ensure that the counting of complete cycles is accurate. It will be appreciated a digital computer is often required to process the outputs of various different navigational systems and counter outputs of the receiver described above can be utilised as one of possibly a number of different inputs to the computer. If it is required to provide a direct visual indication of the position line information, it is often convenient to use the time difference to control another oscillator at the frequency $mf$ so that it is locked to the received signals of frequency $nf$. The outputs of the two oscillators may then be applied to a phase discriminator driving an integrating phase angle indicator in accordance with the phase difference between the two oscillators.

In yet another arrangement, the time difference is obtained by forming the first time index as a pulse of a duration approximately ½ cycle long at the frequency $nf$ and applying this pulse (having the repetition rate of $1f$) to one input of a phase discriminator to the other input of which is applied the received signals of frequency $nf$. A second similar phase discriminator compares the $1f$ pulse with the received signal at frequency $nf$ shifted in phase by 90° and the outputs of these two discriminators are used as sine and cosine signals to drive an integrating phase angle indicator.

More generally, a pulse at the divided down frequency signal and having a duration of half a cycle or less at the radio frequency may be used as a gating pulse in a phase discriminator or synchronous detector for detecting a separately received radio frequency signal and the output of this phase discriminator or synchronous detector will be representative of the phase angle between the two received signals.

In all the arrangements described above, frequency division is used dividing down an oscillator signal which is locked to one of the received signals. The use of a locked oscillator ensures that the signal is continuously available although the actual received signal may be interrupted since, in most phase comparison radio navigation systems, the sharing of the various different frequencies is employed. Ambiguities in the divider locking are immaterial so long as the divider lock remans constant after the receiver has been set in operation; this however presents no problems with present-day types of frequency dividers counting down the number of cycles of an input. In each of these arrangements the lane spacing, that is to say the distance along a base line between two transmitting stations over which the movement of the craft would give 1 cycle of measured phase change is a half wavelength at one of the actual transmitted frequencies. The receiver is thus able to give the high accuracy of indication which is possible with phase comparison systems. In the system of the present invention, however, the division in the frequency dividers may be by very large numerical factors, greatly in excess of 12. It is thus possible to use actual ratio frequencies which are much closer together than is possible in systems where only relatively small multiplication or division factors can be employed. For example, in one of the embodiments of the invention to be described later three frequencies, 70,912.5 Hz., 70,762 Hz. and 70.537.5 Hz. are employed. Such a narrow frequency band not only makes it easier to fit a navigation system into the radio frequency spectrum but more particularly has advantages in that propagation conditions are more consistent over a narrow band.

In each of the receiving arrangements described above, an integrating form of indicator has to be employed. The initial setting of the indicators to the correct readings when the navigation system is brought into operation may be effected in the known way, i.e., either from knowledge of the actual position of the craft or by the use of further transmissions which provide a coarse but unambiguous positional determination. In this system, if the indicator is set correctly to the appropriate fraction of a lane, as well as to the correct lane count, the integration will result in the exact position indication to a fraction of a lane being determined and indicated. Even if the exact position is not determined, the integrating system will correctly integrate changes of position so that the indication is to the same accuracy as the initial setting of the indicators.

BRIEF DESCRIPTION OF THE DRAWINGS

FIGURE 3 is a diagram illustrating the waveform of the inputs to and output from a gate and timer circuit in the receiver of FIGURE 2;

FIGURE 4 is a block diagram illustrating yet another receiver for a hyperbolic radio frequency navigation system; and FIGURE 5 is a circuit diagram illustrating a phase-splitting circuit for use in the receiver of FIGURE 4.

FIGURE 1 illustrates a receiver for a radio navigation system in which three spaced transmitting stations radiate phase-locked signals of frequencies $1891f$, $1887f$ and $1881f$. Typically the fundamental frequency $f$ might be 37.5 cycles per second so that the radiated frequencies are 70.9125 kHz., 70.7625 kHz. and 70.5375 kHz. In the receiver, the signals are received by an antenna 10 and fed to receiver channels 11, 12 and 13 tuned respectively to the three frequencies $1891f$, $1887f$ and $1881f$. Oscillators 14, 15 and 16 are tuned respectively to these frequencies and are phase-locked to the received signals by means of phase discriminators 17, 18 and 19 which compare the respective oscillator and received signals to provide control signals for controlling the oscillators. These oscillators thus provide continuous outputs phase-locked to the received signals despite any possible interruptions in the reception. The transmissions may therefore be deliberately switched as is done in many radio navigation systems for various purposes.

Figure 1:
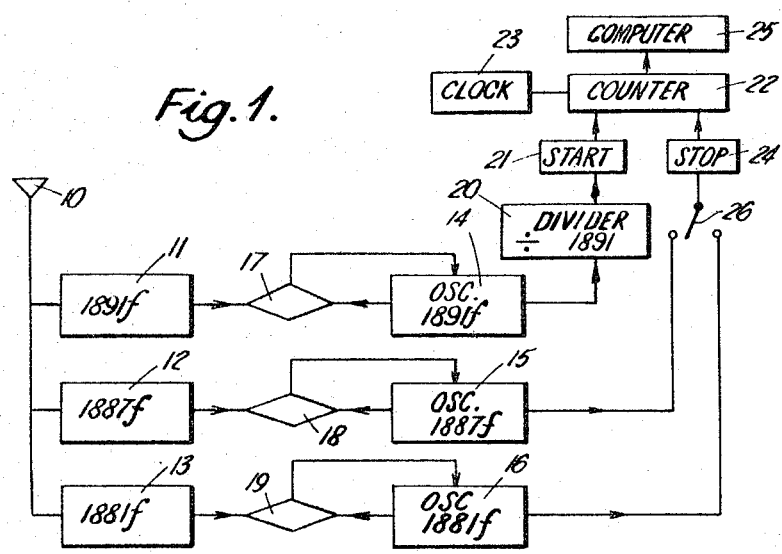
FIGURE 1 is a block diagram illustrating a receiver for a hyperbolic radio frequency navigation system.

The output from the $1891f$ oscillator 14 is divided down in a frequency divider 20 by a factor of 1891 to give a $1f$ output with rectangular waveform. This may readily be done with a divider of the type counting cycles of the input signal. From this $1f$ signal, a cycle index impulse, of short duration compared with the duration of a radio frequency cycle, is obtained in a shaping unit 21 and is applied as a start signal for a high frequency counter 22 counting signals from a clock pulse generator 23. The stop pulse is obtained by squaring the output of the oscillator 15 in a squarer 24. The counter thus measures the time interval between the time index constituted by the $1f$ impulse from the shaping unit 21 and the next succeeding time index signal at the frequency $1887f$. This count is thus indicative of the fractional phase difference between the $1f$ index and the $1887f$ index in relation to a $1887f$ cycle. Changes in phase are correctly measured but, because of the ambiguities in the possible divider lock settings, the actual phase angle is not determined.

In the particular arrangement of FIGURE 1, the output of the counter 22 is periodically interrogated by a computer 25 and the changes in time difference represented by the counter output are integrated. To ensure proper cycle counting, this interrogation must be sufficiently frequent that the counter output does not change by more than the equivalent of ¼ cycle of phase change between interrogations.

The comparison between the $1891f$ signal and the $1887f$ signal provides one position line determination. A second position line, to obtain a position fix, is provided by utilising the output of the $1881f$ oscillator 16 in place of the $1887f$ oscillator 15. This is done by means of a solid state switch 26 controlled by the computer 25.

Figure 2:
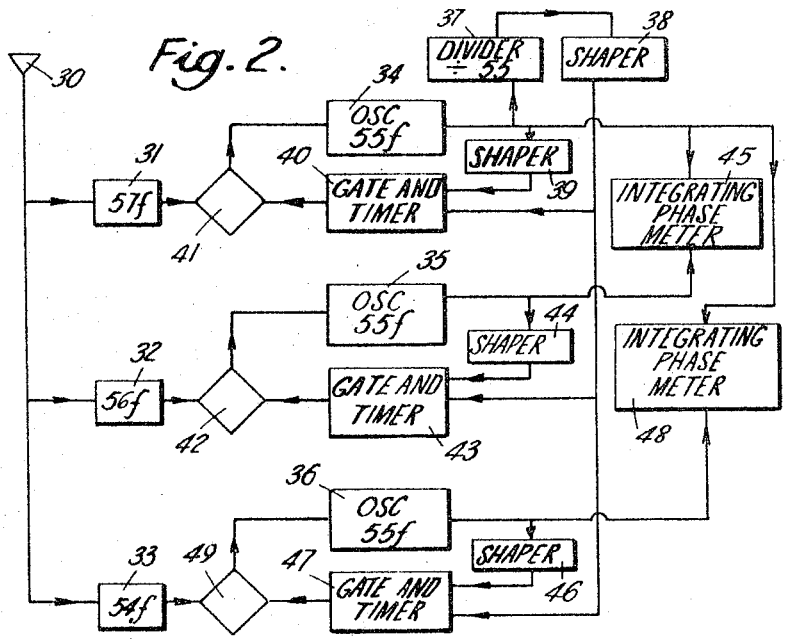
FIGURE 2 is a block diagram illustrating another construction of receiver for a hyperbolic radio frequency navigation system.

FIGURE 2 shows another receiver which, compared with FIGURE 1 required a lower duty time percentage for the phase discriminator and synchronous control of the oscillators for the phase difference determination.

In FIGURE 2, it is assumed that signals from a master station at a frequency $57f$ are to be compared in phase with signals radiated from two slave stations at frequencies $56f$ and $54f$, respectively.

The signals are received by an antenna 30 and fed to frequency selective receiving channels 31, 32 and 33 tuned to $57f$, $56f$ and $54f$, respectively. In this construction there are oscillators 34, 35 and 36, one for each channel, all operating at the frequency 55*f*. The 57*f* receiving channel 31 feeds a synchronous gate type of phase discriminator or detector 41. As will be more fully described later, the discriminator gate is opened for several cycles (at 55*f*) for one period in each 1*f* cycle. This 1*f* period is obtained by division of the 55*f* signal from oscillator 34 down to 1*f* in a frequency divider 37 and shaping the output in a shaping circuit 38. The 55*f* signal from the oscillator 34 is also applied to a shaping circuit 39 to produce a series of impulses at a frequency 55*f* having a duration short compared with a cycle at 55*f*. The outputs from the shaping circuits 38 and 39 are shown respectively in lines *a* and *b* of FIGURE 3 and they are applied to an AND gate and timing circuit 40 (FIGURE 2) to produce a short train of pulses at a frequency 55*f*, each pulse lasting for ½ cycle at a frequency 55*f*. The trains of pulses are repeated at a frequency 1*f* and each train has a time duration, determined by the shaping circuit 38, not exceeding ¼ of a cycle at the frequency difference between the two signals to be compared. In this case, the two signals are 55*f* and 57*f* and hence the time duration does not exceed 1/2×55*f* seconds. The output train of pulses from the circuit 40 is shown at *c* in FIGURE 3. This is applied to a phase discriminator 41 to which are also applied the received signals at 57*f* from the receiving channel 31.

The operation of this phase discriminator may best be visualised by considering the waveform of the beat signal between 55*f* and 57*f*. At one point in the beat signal cycle, the 55*f* and 57*f* are additive; half a cycle later (at the beat frequency) the 55*f* and 57*f* are in opposition. It will be seen therefore that if the pulse train of FIGURE 3(*c*) is applied to one input of the discriminator (or synchronous detector) and the 57*f* signals to the other input, the output will depend on the position of the pulse train in a cycle of the best beat frequency. As is well known, shifting the phase of one of two signals mixed together will give an angular phase shift of the same amount to the beat frequency. Thus the output of the phase discriminator 41 is filtered and used to control the frequency of the oscillator 34 so as to maintain the 55*f* output of this oscillator in a synchronous frequency and multiple phase lock with the received 57*f* signals.

It has previously been said that the train of pulses shown in FIGURE 3(*c*) has a duration of less than ¼ cycle at the beat frequency of 2*f*. This time can be reduced and, in the limit, only a single pulse in the train employed. If only a single pulse is used, this might be obtained directly from the shaping circuit 38. However, any appreciable deviation from the duration of ¼ cycle at the beat frequency of 2*f* would result in a lower output from the phase discriminator. Compensation for this could be obtained by use of higher gain in a D.C. amplifier coupled to the discriminator output providing the D.C. offset voltage of the D.C. amplifier is sufficiently low. The noise to signal ratio will not suffer by a reduction of the discriminator duty time providing the band width of the 57*f* receiving channel 31 is less than ½*f*, i.e., if the averaging time of the amplifier filter is substantially greater than the time between samples, the noise to signal ratio will not be increased by the shortened duty cycle.

The 56*f* receiving channel 32 feeds a second discriminator 42 of the synchronous gate type having its second input from a gate and timing circuit 43 similar to the circuit 40 but with a first input from the shaping circuit 38 and a 55*f* impulse input from a shaping circuit 44 fed from the oscillator 35. The output of the phase discriminator is filtered and applied as a frequency control to the oscillator 35. The oscillator 35 is thus maintained in phase lock with the received signals from the receiving channel 32; the operation is similar to the control of the oscillator 34. It will be noted however that the 1*f* timing pulses are derived from the same source for both oscillators 34 and 35.

The arrangement thus far described provides a pair of equi-frequency oscillators 34 and 35 each time-locked to a separate received signal. A conventional integrating phase difference meter 45, such as the "decometer" used in the Decca Navigator System (Decca is a registered trademark) with its associated D.C. amplifiers, is coupled to the two oscillators 34, 35 to give a position line indication. This position line is a hyperbolic position line with respect to the 57*f* and 56*f* transmitting stations and is part of a pattern of lines having a lane width corresponding to the 55*f* comparison frequency.

A second position line is obtained using the 57*f* signals and the 54*f* signals from the receiving channel 33. The latter are applied to one input of a phase discriminator 49. The second input is fed with a train of pulses at 55*f*, similar to those of FIGURE 3(*c*), the trains being obtained from a gate and timing circuit 47 to which are applied the pulses from the shaping circuit 38 and 55*f* impulses from the oscillator 36. The output of the discriminator is used to control the frequency of the oscillator 36. The latter thus provides a 55*f* output multiplephase locked and synchronised with the received 54*f* signals. The outputs of the oscillators 34 and 36 are applied to an integrating phase difference meter 48.

The operation of the receiver of FIGURE 2 is analogous to that of FIGURE 1 in that use is made of the time difference between a timing index from the divided down frequency and a time index from the received signals. This may most clearly be seen by considering the extreme case mentioned above where the train of pulses of FIGURE 3(*c*) contains only one pulse derived directly from the shaping circuit 38. It will be seen that the phase discriminator gives an output dependent directly on the time relation between this pulse and the received 56*f* signals (in the case of discriminator 42) or 54*f* signals (in the case of discriminator 49). Instead of determining the time difference with a counter and using this to control an integrating indicator system (the computer 25 of FIGURE 1) it is used to control an oscillator 35 or 36 and thus to operate a conventional type of integrating phase difference meter 45 or 48.

FIGURE 4 illustrates a receiving system having only one oscillator. This may be employed where the radiated signals are uninterrupted or where any interruptions are of such short duration that loss of a cycle cannot occur in the integration. The arrangement of FIGURE 4 thus finds particular application in low frequency systems (e.g., systems using radiated frequencies of the order of 12 kHz.) and more generally in receivers for slow moving craft.

Referring to FIGURE 4, the signals from the transmitting stations are at frequencies 57*f*, 55*f* and 54*f* and are received on an antenna 50 and fed to tuned receiving channels 51, 52 and 53. The output from the 57*f* receiving channel is applied to one input of a phase discriminator 54. The other input is a pulse at a repetition rate of 1*f* and having a duration of ½ cycle of a 57*f* frequency. This pulse is obtained from a 45*f* oscillator 55 by means of a frequency divider 56 dividing down the oscillator output by a factor of 45 and a shaping circuit 57. This 1*f* pulse forms a synchronous phase discriminator gating pulse and the discriminator 54 provides an output voltage for controlling the frequency of the 45*f* oscillator 55. Thus a harmonic synchronous relation is maintained between the 57*f* received signal and the output of the 45*f* oscillator.

It has been stated that the pulse from the shaper 57 has a duration of ½ cycle at a 57*f* frequency. It will be readily apparent that this is the optimum duration but the value is not critical; the discriminator output falls to zero as the length is increased to one cycle or decreased to zero.

The second receiving channel 52 selects the 55*f* signals and applies these to a 90° phase splitter 60 which is preferably of the form described later with reference to FIG- URE 5. The two outputs of this phase splitter are applied repectively to phase discriminators or synchronous detectors 61, 62. The other inputs to these are the 1*f* pulses from the shaping circuit 57. The outputs of these two discriminators are representative respectively of the sine and cosine of the phase angle between the 57*f* and 55*f* signals and are applied to an integrating phase meter 63. This conveniently is a "decometer" with its associated amplifiers. This provides a position line indication with respect to a hyperbolic pattern having a lane width equal to the slave frequency, i.e., 55*f*. As in the receiver of FIGURE 2, however, the indicator has initially to be set to the correct reading; thereafter it will correctly integrate all changes of the phase relationship to give a position line indication.

A second position line is obtained using the 54*f* slave signals from the receiving channel 53. These are applied to a 90° phase splitter 65 feeding two phase discriminators or synchronous detectors 66, 67 to which are also applied the 1*f* pulses from the shaping circuit 57. The outputs are applied to a second integrating phase meter 68.

The receiver of FIGURE 4, like that of the FIGURES 1 and 2, makes use of the time difference between a 1*f* time index from a frequency divider dividing down the output of a local oscillator and the time phase of the other received signals. In FIGURE 4 by using a phase splitter, time differences corresponding to sine and cosine signals are obtained and these are used to drive the phase angle integrator.

A particular advantage of the receiver of FIGURE 4 is that it is readily possible to alter the frequency selection of the receiver channels in steps of 1*f* provided the 90° phase split is maintained. Thus the receiver may be used with systems, such as have heretofore been proposed, in which a large number of slave stations are arranged to transmit on different multiples of a common fundamental frequency.

Many conventional 90° phase splitting circuits will not maintain a reasonable 90° phase split over a range of frequencies and, if they were employed, the phase angle indicators 63, 68, although they would correctly count cycles of phase change, would have to be calibrated around their dials with different calibrations for different frequencies. FIGURE 5 illustrates a phase splitting circuit to give a 90° phase shift without any serious deviation over a wide frequency range. In FIGURE 5 the radio frequency input is applied to a coupling coil 69 between the base of a transistor 70 and ground. The emitter of this transistor 70 is fed with a constant direct current by a second transistor 71. The emitter of the first transistor 70 is coupled to a high input impedance emitter follower transistor 72 and to a capacitive load 73. The reactance of this load at the operating frequency in this embodiment is about 5000 ohms. The collector of the first transistor 70 feeds the emitter of a fourth transistor 74. The collector current of the fourth transistor is thus substantially equal to the current to the capacitive load 73. A 5000 ohm resistor 75 in the collector circuit of transistor 74 will therefore give a voltage at the collector of this transistor which is substantially equal to that at the emitter of the first transistor 70. However these two voltages will have a phase difference of substantially 90°. The collector of the fourth transistor is coupled to a high input impedance emitter follower transistor 76 similar to transistor 72. The transistors 72 and 76, by means of output transformers 77, 78, respectively, in their emitter circuits, provide the required two outputs which are substantially equal in amplitude but differ in phase by 90°. When a frequency change is made, to maintain equality of amplitude, the magnitude of either the capacitor 73 or the resistance 75 must be changed to maintain equality of their impedances.

We claim:

1. A receiver for use with a hyperbolic radio navigation system in which synchronised signals of frequency *pf* and *nf* are radiated simultaneously from spaced transmitting stations, each frequency being radiated by only one station at a time, *p* and *n* being different integers greater than 12, and *f* being a fundamental frequency, which receiver comprises an oscillator at a frequency *mf* when *m* is an integer greater than 12 which may be the same or different from *p* and *n*, means for synchronising said oscillator with a received signal of frequency *pf*, a frequency divider providing a time index at frequency 1*f* locked to the output of the oscillator, and timing means responsive to the time interval between the 1*f* time index and a next succeeding time index locked to the *nf* signals.

2. A receiver as claimed in claim 1 wherein means are provided for integrating the time interval determined by said timing means.

3. A receiver as claimed in claim 2 wherein there is provided a second oscillator at frequency *mf* associated with the received signals of frequency *nf*, *m* differing from *n* and *p*, and wherein said timing means comprises, for each received signal, a synchronous detector having two inputs and an output, a gating and timing circuit to which are applied impulses synchronised with the cycles of said second oscillator to produce a train of half cycle duration impulses at the frequency *mf*, which gating and timing circuit has a gate control input, means for applying to said gate control input a pulse from said divider at the frequency 1*f*, whereby said train is gated to pass for a short period, means for applying the gated train of half cycle pulses of the frequency *mf* to one input of said synchronous detector to the other input of which is applied the received signals of frequency (*nf* or *pf*), means for applying the voltage from the output of said synchronous detector as a control voltage to the associated oscillator whereby the first oscillator is locked to received signals of frequency *pf* and the second oscillator to received signals of frequency *nf* and the phase relation of the output of the oscillators is a measure of the aforementioned time interval and wherein the means for integrating the time interval comprises an integrating phase meter integrating changes in the phase difference between said oscillators.

4. A receiver as claimed in claim 3 wherein said short period for each received signal, is approximately ½ a cycle at the difference frequency between *mf* and the received signal frequency.

5. A receiver as claimed in claim 1 wherein said time indices are short duration pulses and wherein there is provided a counter counting constant frequency pulses, said time indices being used to start and stop said counter.

6. A receiver as claimed in claim 5 in combination with a digital computer wherein means are provided for interrogating the counter output and transferring it to the computer.

7. A receiver as claimed in claim 6 and installed in a vehicle wherein the counter output is interrogated and transferred to the computer at a frequency high enough that, at the maximum possible speed of the vehicle, there will be less than ¼ of a cycle of the effective hyperbolic pattern frequency between interrogations.

8. A receiver as claimed in claim 1 wherein there is provided a further oscillator at the frequency *mf* controlled so that it is locked to the received signals of frequency *nf*, an integrating phase angle meter, and a phase discriminator driving said integrating phase angle meter in accordance with the phase difference between the signals from the two oscillators.

9. A receiver as claimed in claim 1 and in which *m* differs from *n* and *p* wherein there is provided a second oscillator of frequency *mf* for synchronising with the received signals of frequency *nf*, the two oscillators being voltage-controlled oscillators and wherein there is provided, for each of the received signal frequencies *nf* and *pf*, a gating and timing circuit and a phase discriminator providing an output oscillator control voltage dependent on the phase difference of two inputs, means for applying the received signal frequency (*nf* or *pf*) to one input of the phase discriminator, means for applying the output of the gating and timing circuit to the other input of the discriminator, means for applying the output of the discriminator to the associated oscillator to control the frequency thereof whereby the oscillator is synchronised with the received signals, a shaper providing a train of output pulses derived from the oscillator output to one input of the associated gating and timing circuit and means for providing a second input to said gating and timing circuit from said divider to open the gate for a period in each cycle of the output of said divider synchronised with the divider output, and an integrating phase meter integrating changes in phase difference between said oscillators.

10. A receiver as claimed in claim 1 wherein $m$ differs from $n$ and $p$ and wherein said timing means comprises a phase splitter producing, from the received signal of frequency $nf$, two signals of that frequency in phase quadrature, a pair of synchronous detectors, means for applying to each synchronous detector a short duration pulse from said divider at the frequency $1f$, means for applying the quadrature signals respectively to the two synchronous detectors whereby the synchronous detectors produce outputs representative respectively of the sine and cosine of the phase angle between the received $nf$ and $pf$ signals and a phase angle indicator feed from said outputs.

11. A receiver as claimed in claim 10 wherein said phase angle indicator is an integrating phase angle indicator.

12. A receiver as claimed in claim 10 wherein said short duration pulse has a duration of substantially half a cycle at the frequency $pf$.

13. A receiver as claimed in claim 1 wherein said frequency divider is arranged to produce a pulse of a duration of half a cycle or less at the frequency $pf$ and wherein there is provided a synchronous detector, means feeding said pulse from said frequency divider as a gating pulse to said synchronous detector, means for feeding a received radio frequency signal of frequency $nf$ to said synchronous detector to be detected thereby to provide an output representative of the phase angle between the received signals of frequency $nf$ and $pf$.

14. A receiver as claimed in claim 1 wherein said divider is of the type counting down the number of cycles of the input signal.

References Cited
UNITED STATES PATENTS

| | | | |
|---|---|---|---|
| 3,136,995 | 6/1964 | Jolliffe et al. | 343—105 |
| 3,195,135 | 7/1965 | Fleuchans | 343—105 |
| 3,202,993 | 8/1965 | O'Brien | 343—105 |
| 3,209,356 | 10/1965 | Smith | 343—105 |

RODNEY D. BENNETT, Jr., Primary Examiner

HERBERT C. WAMSLEY, Assistant Examiner